United States Patent
Sumioka

(10) Patent No.: US 9,893,650 B2
(45) Date of Patent: Feb. 13, 2018

(54) DRIVING CIRCUIT FOR A VIBRATION TYPE ACTUATOR, VIBRATION DEVICE, IMAGE BLUR CORRECTION APPARATUS, REPLACEMENT LENS, IMAGE PICKUP APPARATUS, AND AUTOMATIC STAGE

(71) Applicant: CANON KABUSHIKI KAISHA, Tokyo (JP)

(72) Inventor: Jun Sumioka, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 7 days.

(21) Appl. No.: 15/234,800

(22) Filed: Aug. 11, 2016

(65) Prior Publication Data
US 2017/0054387 A1    Feb. 23, 2017

(30) Foreign Application Priority Data
Aug. 18, 2015  (JP) .................................. 2015-161357

(51) Int. Cl.
| | | |
|---|---|---|
| *H02N 2/00* | (2006.01) | |
| *H02M 7/523* | (2006.01) | |
| *H04N 5/232* | (2006.01) | |
| *H02N 2/06* | (2006.01) | |
| *G02B 27/64* | (2006.01) | |
| *G02B 21/26* | (2006.01) | |

(52) U.S. Cl.
CPC ............. *H02N 2/008* (2013.01); *G02B 21/26* (2013.01); *G02B 27/646* (2013.01); *H02M 7/523* (2013.01); *H02N 2/06* (2013.01); *H04N 5/23287* (2013.01)

(58) Field of Classification Search
CPC ..... H04N 5/23287; H02N 2/06–2/142; H02M 7/523; H02M 2007/4818; G03B 2205/0007–2205/0038; G02B 27/646
See application file for complete search history.

(56) References Cited

U.S. PATENT DOCUMENTS

| | | | | |
|---|---|---|---|---|
| 4,980,597 A | * | 12/1990 | Iwao .................... | H02N 2/0015 310/316.01 |
| 8,552,619 B2 | | 10/2013 | Sumioka | |
| 9,065,359 B2 | * | 6/2015 | Iwasa ..................... | H02N 2/142 |
| 2004/0195935 A1 | * | 10/2004 | Jansson ................ | H02N 2/0015 310/317 |
| 2013/0329836 A1 | * | 12/2013 | Murakami ........... | H04B 7/0417 375/340 |
| 2013/0334989 A1 | | 12/2013 | Kataoka | |

FOREIGN PATENT DOCUMENTS

| | | |
|---|---|---|
| JP | 03-032374 A | 2/1991 |
| JP | 2014-236629 A | 12/2014 |

* cited by examiner

*Primary Examiner* — Nhan T Tran
*Assistant Examiner* — Chriss Yoder, III
(74) *Attorney, Agent, or Firm* — Canon USA, Inc., IP Division

(57) ABSTRACT

A driving circuit for a vibration type actuator includes an inductor and a capacitor which are connected in series to an electric-mechanical energy conversion element, in which, in a case where a series resonance frequency based on the inductor and the capacitor is set as fs, and a resonance frequency in a vibration mode other than vibration used for driving of the vibrator is set as fu, 0.73·fu<fs<1.2·fu is satisfied.

22 Claims, 14 Drawing Sheets

DRIVING CIRCUIT FOR A VIBRATION TYPE ACTUATOR, VIBRATION DEVICE, IMAGE BLUR CORRECTION APPARATUS, REPLACEMENT LENS, IMAGE PICKUP APPARATUS, AND AUTOMATIC STAGE

BACKGROUND OF THE INVENTION

Field of the Invention

One disclosed aspect of the embodiments relates, for example, to a driving circuit for a vibration type actuator, a vibration device, an image blur correction apparatus, a replacement lens, an image pickup apparatus, and an automatic stage.

Description of the Related Art

A vibration type motor is an example of a vibration type actuator and includes an elastic member, a vibrator including an electric-mechanical energy conversion element such as a piezoelectric element coupled to the elastic member, and a driven member in pressure contact with the vibrator. The vibration type motor is a non-electromagnetic driving system motor arranged to apply an alternating-current (AC) voltage to the electric-mechanical energy conversion element to generate a high-frequency vibration in the element and take out the vibration energy as a continuous machine motion.

A control apparatus for the vibration type actuator includes a pulse signal generation unit configured to generate a pulse signal and a booster circuit configured to apply the amplified AC voltage to a piezoelectric element included in the vibrator. A speed of the vibration type actuator can be controlled on the basis of a frequency, an amplitude, a phase difference, or the like of the AC voltage applied to the piezoelectric element, and the vibration type actuator is used, for example, for autofocus driving of a camera or the like. The autofocus driving needs highly accurate positioning control, and position feedback control using a position sensor is performed, for example.

At the time of control, by using a phenomenon that a vibration amplitude is increased as a driving frequency is closer to a resonance frequency of a driving vibration mode of the piezoelectric element, and the vibration amplitude is decreased as the driving frequency is farther away from the resonance frequency towards a high-pass side, a lens corresponding to a driving target object is driven at a high speed or a low speed.

At this time, in a case where a speed range is desired to be widely extended from an ultralow speed to a high speed, a used driving frequency range needs to be extended. However, in a case where the driving frequency range is extended, an unwanted vibration mode corresponding to a vibration mode that is not used for driving of the vibration type actuator is excited, and abnormal noise may be generated.

Descriptions will be given of the unwanted vibration. Although depending on a model of the vibration type motor, the unwanted vibration mode exists in a frequency that is twice, three times, or ½ times as high as the driving frequency or its intermediate or the like. With the application of the AC voltage to the vibration type actuator, a vibration wave for exciting a driving unit of the vibrator to cause an elliptical motion is generated, and the driven member and the vibrator contact with each other, so that a relative position of the vibrator and the driven member changes in a linear direction or a rotation direction. During the driving of the vibration type actuator, a contact pressure at a contact unit is ideally regularly constant, but in actuality, the contact pressure is varied due to irregularities of a contact surface of the driving unit and the driven member and is also changed depending on a contact position. That is, in a case where the contact pressure is changed during the driving and a vibration mode other than the vibration used for the driving is generated, the unwanted vibration randomly occurs in the vibrator at a frequency that is different from the driving frequency. The unwanted vibration disturbs a driving efficiency and also may be a cause of the generation of the abnormal noise.

The following method is proposed to address this matter. According to a technology described in Japanese Patent Laid-Open No. 03-032374, an impedance element is provided in parallel to an electrostatic capacitance of the piezoelectric element to form a closed circuit, and a parallel resonance frequency is matched to a vibration frequency of a fixed member. A variable coil is used as the impedance element.

SUMMARY OF THE INVENTION

However, the above-described technology is not focused on a phenomenon that a voltage variation in a driving circuit is caused by a change in an impedance in an unwanted vibration frequency to amplify abnormal noise as a result, and an effect of avoiding the abnormal noise is not attained according to the technology in the related art.

A driving circuit for a vibration type actuator according to an aspect of the embodiments includes an inductor and a capacitor which are connected in series with the inductor, in which the inductor and the capacitor are configured to be connected in series to an electric-mechanical energy conversion element of a vibrator, and in a case where a series resonance frequency based on the inductor and the capacitor is set as fs, and a resonance frequency in a vibration mode other than vibration used for driving of the vibrator is set as fu, $0.73 \cdot fu < fs < 1.2 \cdot fu$ is satisfied.

Furthermore, in a case where a transformer is used, a driving circuit for a vibration type actuator according to another aspect of the embodiments includes a transformer that includes a primary side coil and a secondary side coil and is configured such that an alternating-current voltage is applied to the primary side coil, a first terminal of the secondary side coil is connected to a first terminal of an electric-mechanical energy conversion element of a vibrator, and a second terminal of the secondary side coil is connected to a second terminal of the electric-mechanical energy conversion element, and an inductor and a capacitor connected in series to at least one of the primary side coil and the secondary side coil of the transformer, in which, in a case where a series resonance frequency based on the inductor and the capacitor is set as fs, and a resonance frequency in a vibration mode other than a vibration used for driving of the vibrator is set as fu, $0.73 \cdot fu < fs < 1.2 \cdot fu$ is satisfied.

Further features of the disclosure will become apparent from the following description of exemplary embodiments with reference to the attached drawings.

DESCRIPTION OF THE EMBODIMENTS

Figure 1A:
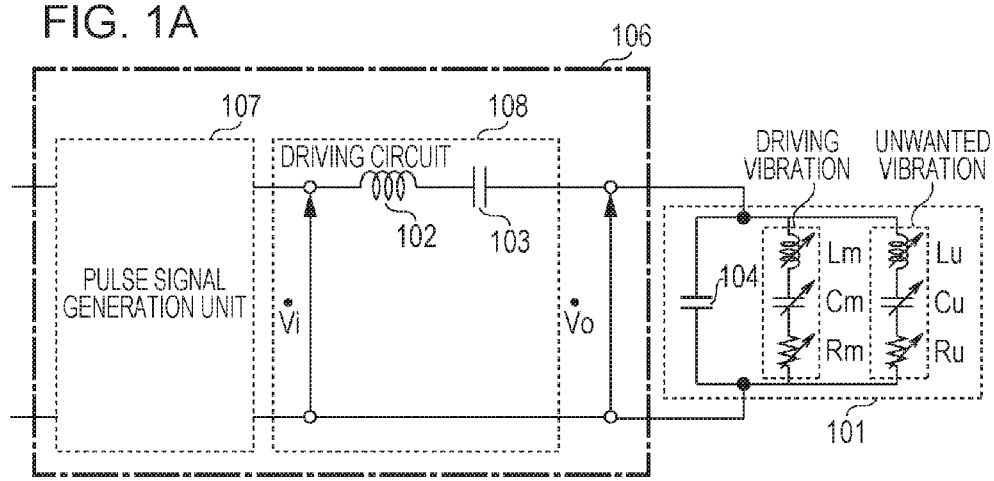
FIGS. 1A to 1C illustrate a vibration device including a driving circuit for a vibration type actuator and the vibration type actuator according to a first exemplary embodiment of the disclosure.

A driving circuit according to an exemplified embodiment is applied, for example, to the following vibration type actuator. That is, the vibration type actuator driven by the driving circuit according to the exemplified embodiment is provided with a vibrator including an electric-mechanical energy conversion element such as a piezoelectric element and an elastic member coupled to the electric-mechanical energy conversion element, and a driven member in pressure contact with the elastic member and configured such that a relative position of the vibrator and a part of the driven member changes). Each of a plurality of AC voltages (used as driving signals) having different phases is applied to the electric-mechanical energy conversion element to cause the elastic member to generate a vibration wave. The elastic member causes an elliptical motion by the generated vibration wave at a driving portion of the elastic member (e.g., contact portion with the driven member), and a relative position of the elastic member (e.g., vibrator) and the driven member changes by this elliptical motion.

The driving circuit for the vibration type actuator according to the exemplary embodiment can be widely applied to various vibration type actuators, such as, for example, a vibration type actuator of a circular type used for performing rotation driving or the like in a photosensitive drum of a copier or a transfer belt of an image forming apparatus. The driving circuit can be applied to the vibration type actuator of the circular type which forms a travelling wave in the vibrator to change the relative position of the vibrator and the driven member.

In addition, the driving circuit can be applied to the vibration type actuator used for performing zoom driving or autofocus driving of a camera lens. The vibration type actuator is, for example, a rod-like vibration type actuator in which primary bending vibrations in two directions orthogonal to a friction surface (contact surface of the vibrator and the driven member) of the elastic member are excited and overlapped with each other at a time phase of $\pi/2$ to cause a rotation elliptical motion on the friction surface.

According to an exemplary embodiment, a driving direction refers to a direction of relative movement of the vibrator and the driven member in parallel to the contact surface of the vibrator and the driven member. The contact surface of the vibrator and the driven member refers to a surface containing a plurality of contact points between the vibrator and the driven member when viewed microscopically and may be plural, but the contact surface may be regarded as the friction surface of the vibrator or the friction surface of the driven member.

According to the present exemplary embodiment, a circuit in two-phase driving for driving the piezoelectric element functioning as the electric-mechanical energy conversion element separately in two phases will be described as an example. In the case of the two-phase driving, since there is no difference between the first and second phases except that the phases of the AC voltages added to the respective phases are shifted by ±90°, only the first phase part will be described below. It should be noted that the disclosure is not limited to the two-phase driving and can also be applied to a driving circuit of a travelling wave type motor having four or more phases or a standing wave type motor. In addition, an oscillator that generates an AC signal and a switching circuit are also not related to the substance of the disclosure and are not particularly limited.

First Exemplary Embodiment

Descriptions of a Principle of a Chip Vibrator

Figure 2A:
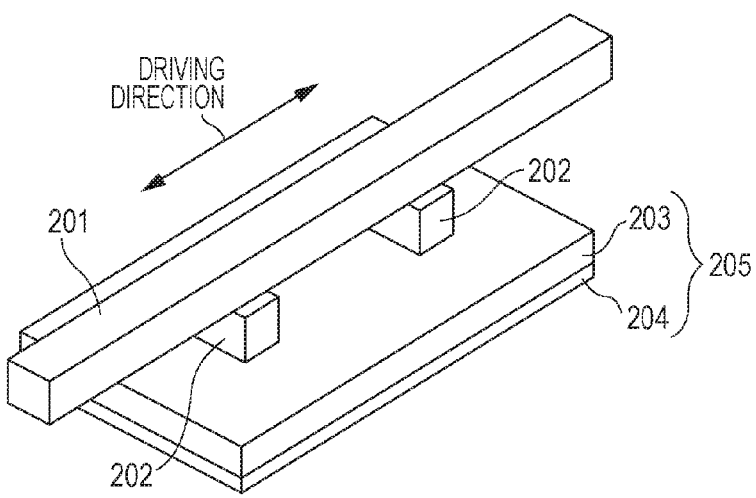
FIGS. 2A to 2D are explanatory diagrams for describing a driving principle of the vibration type actuator of a linear driving type.
Figure 2B:
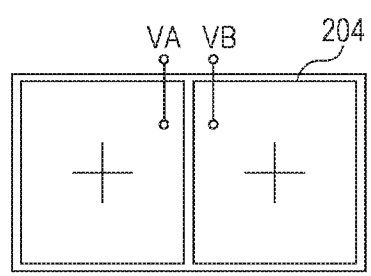
Figure 2C:
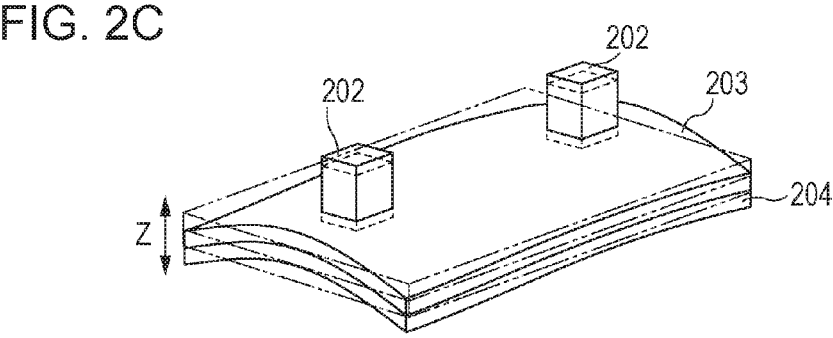
Figure 2D:
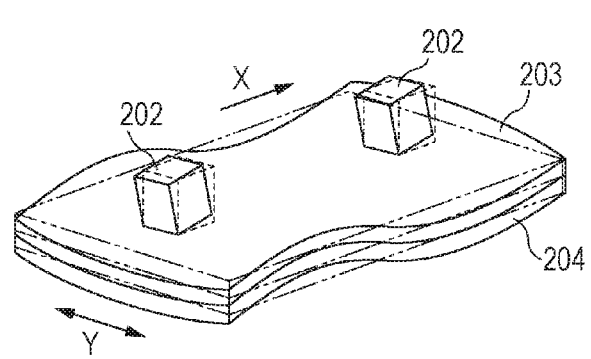

FIGS. 2A to 2D are explanatory diagrams for describing a driving principle of the vibration type actuator of a linear driving type. The vibration type actuator illustrated in FIG. 2A is constituted by, or includes, a vibrator 205 in which a piezoelectric element 204 is bonded to an elastic member 203 and the driven member 201 driven by the vibrator 205. While AC voltages are applied to the piezoelectric element 204, two vibration modes illustrated in FIGS. 2C and 2D are generated, and the driven member 201 in pressure contact with protruding portions 202 in an arrow direction.

FIG. 2B illustrates an electrode pattern of the piezoelectric element 204. For example, electrode areas divided into half in a longitudinal direction are formed in the piezoelectric element 204 of the vibrator 205. Polarization directions of the respective electrode areas are the same direction (+). Among the two electrode areas of the piezoelectric element 204, an AC voltage (VB) is applied to the electrode area located on the right side in FIG. 2B, and an AC voltage (VA) is applied to the electrode area located on the left side. When VB and VA are set as AC voltages having a frequency in the vicinity of a resonance frequency in a first vibration mode and also having the same phase, the entirety (e.g., two electrode areas) of the piezoelectric element 204 is elongated at one moment and contracted at another moment.

As a result, vibration in the first vibration mode (e.g., thrust vibration) illustrated in FIG. 2C is generated in the vibrator 205. When VB and VA are set as AC voltages having a frequency in the vicinity of a resonance frequency in a second vibration mode and also having phases shifted by 180°, the electrode area on the right side of the piezoelectric element 204 is contracted at one moment, and also the electrode area on the left side is elongated. Then, an inverted relationship is established at another moment. As a result, vibration in the second vibration mode illustrated in FIG. 2D (feed vibration) is generated in the vibrator 205.

In this manner, when the two vibration modes are synthesized with each other, the driven member 201 is moved in the arrow direction of FIG. 2A. An occurrence ratio of the first vibration mode and the second vibration mode can be changed by changing a phase difference of the AC voltages input to the voltages divided into half. In this vibration type actuator, it is possible to change a speed of the driven member by changing the occurrence ratio.

Hereinafter, as the present exemplary embodiment, descriptions will be given of a configuration example in which a vibration device including a driving circuit for a vibration type actuator according to the exemplary embodiment and the vibration type actuator driven by the driving circuit is applied to a lens driving mechanism of a camera functioning as an optical device. It should be noted that the configuration example in which the vibration device is mounted to the camera will be described according to the present exemplary embodiment, but the configuration is not limited to this.

Figure 3:
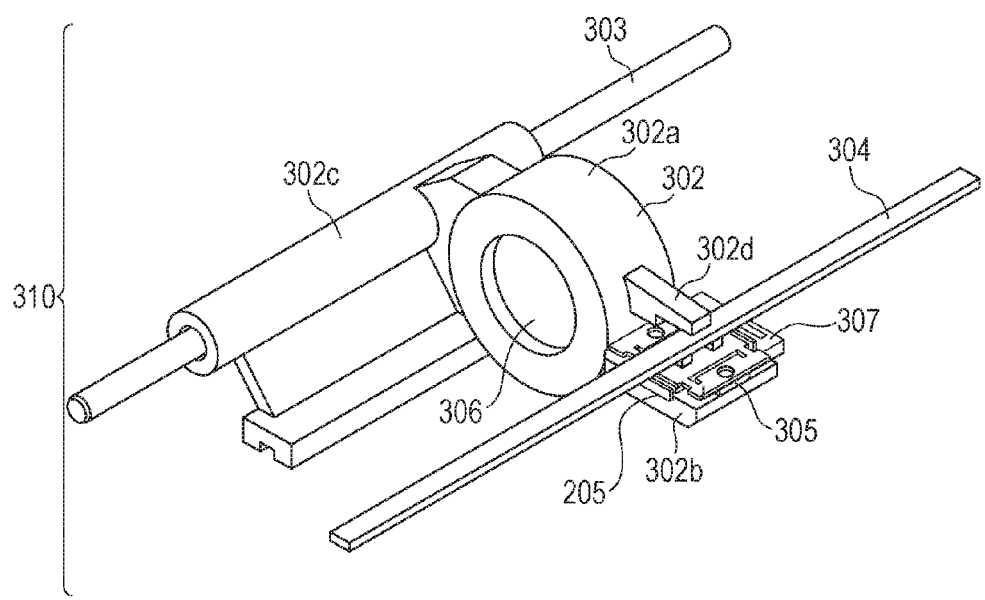
FIG. 3 is an explanatory diagram for describing a driving mechanism of a lens in a lens barrel.

FIG. 3 is an explanatory diagram for describing a driving mechanism of a lens in a lens barrel. The driving mechanism of the lens corresponding to the driven target object using the vibration type actuator according to the present exemplary embodiment is provided with a vibrator, a driven member, a first guide bar and a second guide bar which are arranged in parallel with each other and hold this driven member so as to be freely slid. With the elliptical motion generated by the protruding portion (driving portion) of the vibrator upon application of the driving voltage to the electric-mechanical energy conversion element, relative moving force is generated between the vibrator and the second guide bar in contact with the protruding portion of the elastic member. Accordingly, the configuration is adopted in which the driven member can be moved in the driving direction (herein, the direction in parallel with a direction in which the second guide bar extends) along the first and second guide bars.

Specifically, a driving mechanism 310 for moving the target object, including the vibration type actuator, mainly includes a lens holder 302 functioning as a lens holding member, a lens 306, and the vibrator 205 to which a flexible printed circuit board is coupled. The driving mechanism 310 also includes a pressure magnet 305, a first guide bar 303, a second guide bar 304, and a substrate that is not illustrated in the drawing. Herein, an example is given in which the vibrator 205 and a lens correspond to the vibrator and the target object, respectively.

Both ends of the first guide bar 303 and the second guide bar 304 are held and fixed by the substrate that is not illustrated in the drawing so that those respective guide bars are arranged to be parallel with each other. The lens holder 302 includes a tubular holder portion 302a, a holding portion 302b that holds and fixes the vibrator 205 and the pressure magnet 305, and a first guide portion 302c that is engaged with the first guide bar 303 and realizes a function of a guide.

The pressure magnet 305 included in a pressure unit is permanent magnet. A magnetic circuit is formed between the pressure magnet 305 and the second guide bar 304, and sucking force is generated between these members. The pressure magnet 305 is arranged at a gap with respect to the second guide bar 304, and the second guide bar 304 is arranged so as to be in contact with the vibrator 205. With the above-described sucking force, welding force is applied between the second guide bar 304 and the vibrator 205.

While the protruding portion of the elastic member is in pressure contact with the second guide bar 304, the protruding portion functions as a second guide portion. Since the second guide portion forms a guide mechanism using the sucking force based on the magnetism, a state is established in which the vibrator 205 is pulled away from the second guide bar 304 by receiving external force or the like, but the following measure is taken to address this. That is, a dropout preventive portion 302d included in the lens holder 302 abuts the guide bar, so that the lens holder 302 returns to a desired position. When a desired AC voltage (e.g., a driving signal) is applied to the vibrator 205, driving force is generated between the vibrator 205 and the second guide bar 304, and driving of the lens holder is performed by this driving force.

Figure 14:
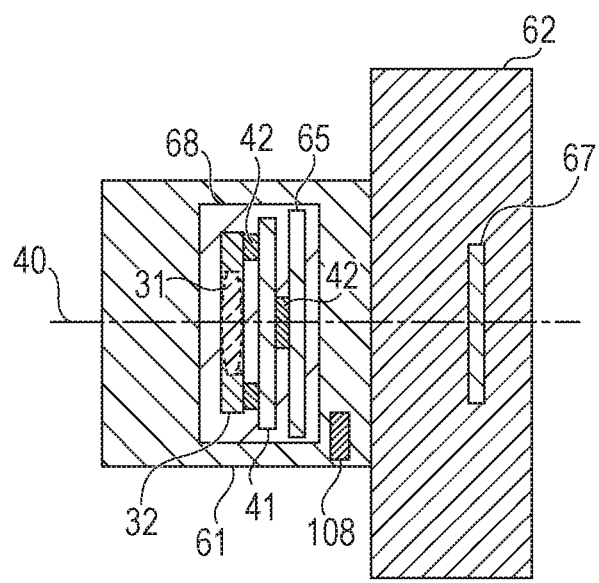
FIG. 14 is a cross sectional view of a camera functioning as an image pickup apparatus configured to correct image blur by a correction lens.

The driving circuit according to the present exemplary embodiment is included in the lens barrel or the like as illustrated in FIG. 14 and is connected to the vibrator 205 via the flexible printed circuit board that is not illustrated in the drawing. In addition, the vibration device may include a position sensor configured to detect a relative position of the vibrator 205 and the second guide bar 304 functioning as the driven member. FIG. 3 illustrates an example in which a position sensor 307 configured to detect a position by a scale bar that is provided on a surface facing the vibrator 205 of the second guide bar 304 and a sensor included in the holding portion 302b is provided. While feedback control is performed by using the relative position detected by the position sensor, it is possible to more accurately move the lens.

Thus, the driving circuit for the vibration type actuator according to an exemplary embodiment can be used for the driving of the lens in the replacement lens.

Driving Circuit According to an Exemplary Embodiment

The driving circuit for the vibration type actuator according to an exemplary embodiment will be described with reference to the drawings.

FIG. 1A illustrates the driving device including the driving circuit for the vibration type actuator according to the first exemplary embodiment and also illustrates the vibration device including the vibration type actuator. A driving device 106 of the vibrator includes a pulse signal generation unit 107 configured to generate a pulse signal and a driving circuit 108 configured to apply an amplified AC voltage to a piezoelectric element 101 included in the vibrator. The pulse signal generation unit 107 includes a switching circuit (H-bridge circuit) configured to output an AC voltage while ON and OFF of a switching element are controlled by a two-phase pulse signal having a driving frequency in accordance with a control signal that is not illustrated in the drawing and having different phases. A DC-DC converter circuit configured to supply a direct current (DC) power supply which is not illustrated in the drawing or the like is connected to the switching circuit, and the AC voltage is generated. It should be noted that a rectangular pulse signal is adjusted such that a pulse width, which may be expressed as a pulse duty, obtains a desired AV voltage amplitude by pulse width modulation (PWM) control.

The AC voltage output from the pulse signal generation unit 107 is boosted to a desired voltage by a driving circuit including an inductor 102 and a capacitor 103. While the rectangular pulse signal is converted into an SIN waveform by a filter effect, the boosted AC voltage is applied to the piezoelectric element 101. The vibration type actuator can control the speed on the basis of a frequency, an amplitude, a phase difference, or the like of the AC voltage applied to the piezoelectric element 101.

Detection Unit of an Unwanted Vibration

Figure 1B:
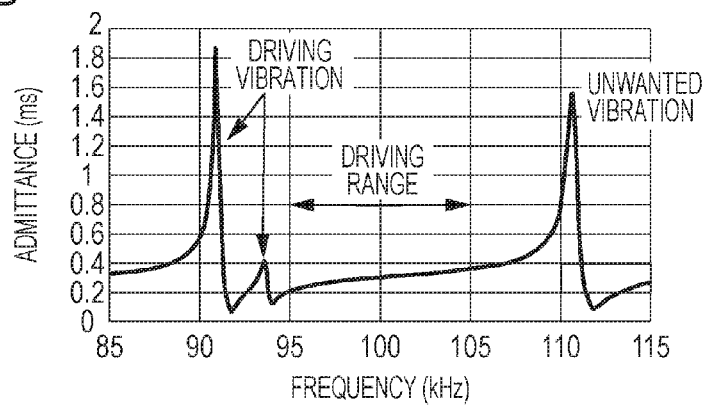

FIG. 1B illustrates an example of an impedance characteristic of the vibrator. The horizontal axis indicates a frequency, and the vertical axis indicates an admittance. A frequency indicating a peak of the admittance is equivalent to a frequency in each vibration mode and indicates an easy for a current to flow, that is, a magnitude of the vibration mode. The present characteristic is obtained when an AC signal having a low amplitude is applied to the piezoelectric element while frequency sweeping is performed, and a response result thereof is subjected to a frequency analysis. The characteristic can be measured by using an impedance analyzer or the like. The first and second vibration modes illustrated in FIGS. 2A to 2D described above are two driving vibrations where the peak is observed at the frequency of 90 to 95 kHz. In FIG. 1B, the peak of the unwanted vibration is detected in the vicinity of the frequency of 110 kHz. Herein, the unwanted vibration refers to a vibration mode other than the vibration used for the driving of the vibrator, that is, a frequency at which the piezoelectric element is deformed in the vibration mode that is not used for the driving and a vibration mode in which the driving of the driven member is disturbed. When the driving range is, for example, 95 to 105 kHz, in a case where the peak value of the unwanted vibration is higher, the unwanted vibration is overlapped during the control, and the abnormal noise is generated. As a detection reference of the unwanted vibration, a condition is set in which an admittance of the unwanted vibration is higher than an admittance of any one of driving vibrations.

Principle of Abnormal Noise Avoidance

In a case where the unwanted vibration occurs in the vibrator, a current accompanied by the unwanted vibration flows through the piezoelectric element, so that the impedance changes. As a result of a keen examination, it is found out that a voltage peak is generated at the frequency of the unwanted vibration in accordance with the change in the impedance in the driving circuit for the vibration type actuator in the related art, which amplifies the unwanted vibration to induce the abnormal noise. That is, if the change in the impedance caused by the unwanted vibration can be suppressed in the driving circuit, it is possible to avoid the abnormal noise.

Detail Descriptions of the Driving Circuit

The function of the above-described driving circuit according to an exemplary embodiment will be described in detail. As a configuration of the driving circuit, the inductor 102 and the capacitor 103 are connected in series to the piezoelectric element 101. Herein, an inductance element such as a coil can be used as the inductor 102. In addition, an electrostatic capacitance element such as a ceramic condenser or a film condenser can be used as the capacitor 103. While the series resonance frequency based on the inductor 102 and the capacitor 103 is substantially matched with the unwanted vibration of the vibrator frequency, it is possible to suppress the change in the impedance caused by the unwanted vibration.

Here, an equivalent circuit of the equivalent circuit of the piezoelectric element 101 will be described. FIG. 1A represents the piezoelectric element 101 of the one-phase part by way of the equivalent circuit. The equivalent circuit of the piezoelectric element 101 is constituted by RLC series circuits corresponding to two mechanical vibration portions and an intrinsic electrostatic capacitance Cd (104) of the piezoelectric element 101 connected in parallel to the RLC series circuit. The two mechanical vibration portions are represented by the respective RLC series circuits based on the driving vibration in the vibration mode that is used for the driving and the unwanted vibration in the vibration mode that is not used for the driving. A self-inductance of the equivalent coil, an electrostatic capacitance of an equivalent condenser, and a resistance value of an equivalent resistance with respect to the driving vibration are respectively defined as Lm, Cm, and Rm. Similarly, a self-inductance of the equivalent coil, an electrostatic capacitance of the equivalent condenser, and a resistance value of the equivalent resistance with respect to the unwanted vibration are respectively defined as Lu, Cu, and Ru. It should be noted that the driving vibration and the unwanted vibration may be two or more vibration modes each having a different frequency.

According to an exemplary embodiment, the series resonance frequency based on the inductor 102 and the capacitor 103 is defined as fs, and the resonance frequency (unwanted vibration frequency) of the unwanted vibration of the piezoelectric element 101 is defined as fu. When a self-inductance of the inductor 102 is set as L, and an electrostatic capacitance of the capacitor 103 is set as C, the following expressions are established.

$$fs = 1/(2\pi\sqrt{LC}) \quad (1\text{-}1)$$

$$fu = 1/(2\pi\sqrt{LuCu}) \quad (1\text{-}2)$$

As the above-described value of fs is closer to the value of fu, it is possible to further reduce a voltage peak of an AC voltage Vo in the vicinity of fu. Herein, Vo denotes an AC voltage applied to the piezoelectric element 101.

It should be noted that a resonance frequency of an entire circuit including the driving circuit and the piezoelectric element is defined as fe. This resonance frequency indicates a general electric resonance frequency and is a frequency at which the driving voltage Vo has a peak. The peak frequency fe of Vo can be calculated from the inductance L of the inductor 102, the electrostatic capacitance C of the capacitor 103, and the electrostatic capacitance Cd (104) of the piezoelectric element 101. An expression of the peak frequency fe is as follows.

$$fe = 1 \Big/ \left( 2\pi \sqrt{L \cdot \frac{C - Cd'}{C + Cd'}} \right) \quad (1\text{-}3)$$

Herein, to calculate the actual peak frequency fe, the piezoelectric element 101 is equivalently regarded as a capacitor, and the calculation needs to be carried out by using Cd' that takes into account the influence of the RLC series circuit of the mechanical vibration portion. For example, in a case where the influence of the RLC series circuit of the mechanical vibration portion is equivalent to the capacitance change of 134 pF, the following calculation can be carried out.

$$Cd' = Cd - 134 \text{ pF}$$

From the expression of the peak frequency fe, it is possible to obtain a function for each of L and C by determining the value of fe.

Confirmation of the Effect

Figure 4A:
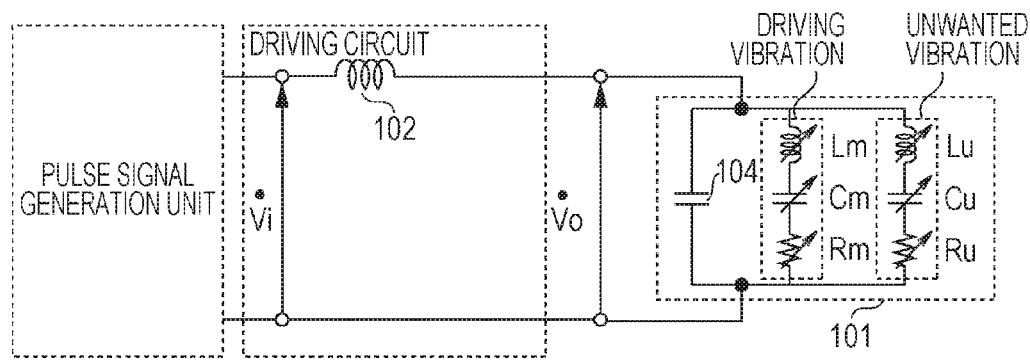
FIGS. 4A and 4B illustrate a vibration device including a driving circuit for a vibration type actuator and the vibration type actuator in a related art.
Figure 4B:
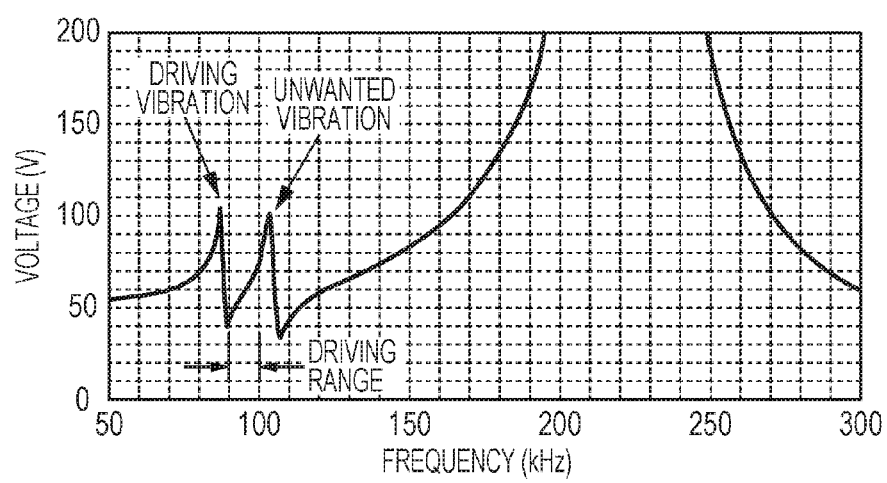

Here, with reference to FIGS. 4A and 4B, a case will be described where only the inductor 102 is connected in series to the piezoelectric element 101, and the capacitor 103 is not connected to the piezoelectric element 101 (e.g., the driving circuit in the related art). FIG. 4B illustrates a calculation result indicating the frequency characteristic of the AC voltage Vo in a case where the driving circuit in the related art illustrated in FIG. 4A is used in which only the inductor 102 is connected in series to the piezoelectric element 101. The amplitude of the AC voltage Vo can be set so as to have a peak at a certain frequency by using an electric resonance of the inductor 102 and the electrostatic capacitance Cd (104) of the piezoelectric element 101.

Herein, while the self-inductance L of the inductor 102 is set as 1 mH and the intrinsic electrostatic capacitance Cd of the electrostatic capacitance Cd (104) of the piezoelectric element 101 is set as 0.54 nF, the setting is made such that the peak frequency fe of Vo becomes 220 kHz. In addition, the driving vibration frequency fm of the piezoelectric element 101 is set as 88 kHz, and the unwanted vibration frequency fu is set as 106 kHz. The equivalent coil Lm of the driving vibration is set as 50 mH, the equivalent condenser Cm is set as 65 pF, and the equivalent resistance Rm is set as 666Ω. The equivalent coil Lu of the unwanted vibration is set as 35 mH, the equivalent condenser Cu is set as 65 pF, and the equivalent resistance Ru is set as 666Ω.

As a result, as may be understood from FIG. 1B, the frequency characteristic of the AC voltage Vo has large voltage variations in the vicinity of fm and fu. Since the driving range of the frequency of the vibration type actuator as illustrated in FIGS. 2A to 2D is in an area between fm and fu, the unwanted vibration is amplified by an influence of the voltage variation in the vicinity of fu to induce the abnormal noise.

Figure 1C:
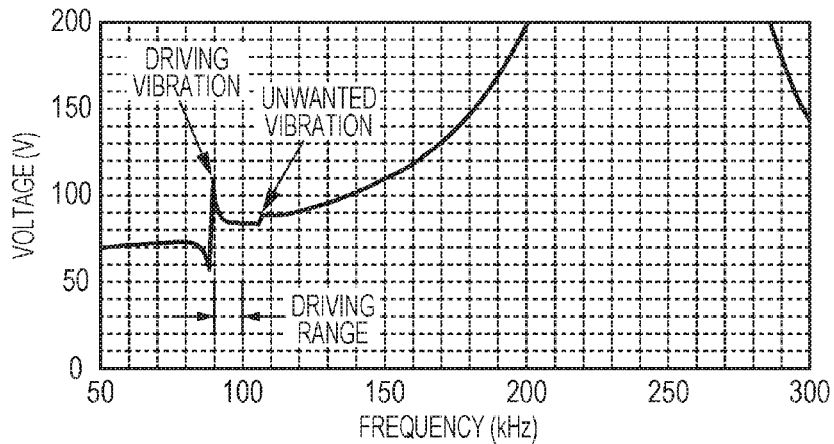

FIG. 1C illustrates a calculation result indicating the frequency characteristic of the AC voltage Vo in a case where the series resonance frequency based on the inductor 102 and the capacitor 103 is matched with the unwanted vibration frequency of the piezoelectric element 101. In this calculation, the self-inductance L of the inductor 102 is set as 1 mH, and the electrostatic capacitance C of the capacitor 103 is set as 2.2 nF. In addition, the equivalent coil Lm of the driving vibration is set as 50 mH, the equivalent condenser Cm is set as 65 pF, and the equivalent resistance Rm is set as 666Ω. The equivalent coil Lu of the unwanted vibration is set as 35 mH, the equivalent condenser Cu is set as 65 pF, and the equivalent resistance Ru is set as 666Ω.

The vertical axis in FIG. 1C indicates an amplitude of the AC voltage Vo on the output side of the driving circuit. As illustrated in FIG. 1C, while fs and fu are matched with each other, it is possible to reduce the voltage peak of the AC voltage Vo in the vicinity of fu. A cause for the occurrence of the amplitude change in the AC voltage Vo in the vicinity of fu is that the change in the impedance occurs because of the self-inductance Lu and the electrostatic capacitance Cu of the mechanical vibration portion of the piezoelectric element 101.

In contrast to this, while fs and fu are matched with each other, matching can be realized with respect to the impedance of the unwanted vibration part of the piezoelectric element 101. Specifically, since a series resonance of the inductor and the capacitor is generated at a frequency at which a current flowing through the unwanted vibration part is increased, an action is taken such that charges accumulated in the capacitor flow to the unwanted vibration part, and the voltage variation can be compensated. As a result, it is conceivable that the amplitude change in the AC voltage Vo applied to the piezoelectric element can be reduced.

Allowable Range of a Relationship Between fs and fu

The series resonance frequency fs based on the inductor 102 and the capacitor 103 connected in series to the piezoelectric element 101 does not necessarily need to be completely matched with the unwanted vibration frequency fu of the piezoelectric element 101. That is, when the value of fs is set to be closer to the value of fu, it is possible to reduce the voltage peak of the AC voltage Vo in the vicinity of fu. It should be noted however that the effect is further increased as fs is closer to fu.

Figure 5A:
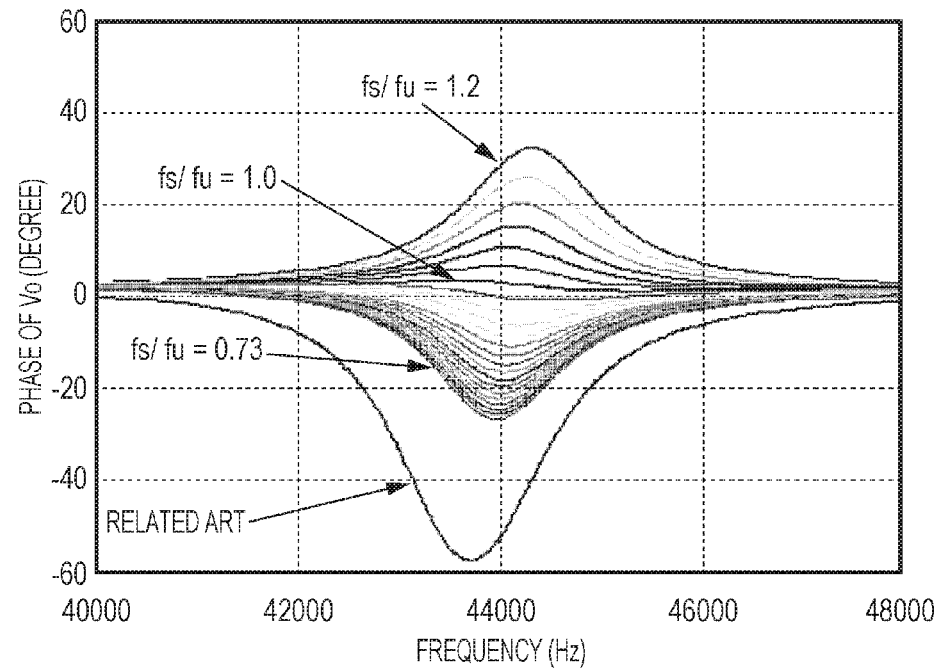
FIGS. 5A and 5B illustrate a relationship between a phase change of an AC voltage and an amplitude variation of the AC voltage.

To clarify a preferably adopted range of fs, focus is paid on the phase change of the AC voltage Vo in the vicinity of the unwanted vibration frequency fu of the piezoelectric element 101. FIG. 5A illustrates a calculation result indicating a phase of the AC voltage Vo. Herein, the vibration type motor of the annular type using the travelling wave is used as an example. The horizontal axis indicates a frequency and indicates a change in the phase of Vo from 40 kHz to 48 kHz while the unwanted vibration frequency fu is set as 44.142 kHz.

In this calculation, by using the driving circuit of FIG. 1A, a ratio of the series resonance frequency fs based on the inductor 102 and the capacitor 103 to fu (which is set as fs/fu) is changed in a range from 0.73 to 1.2, and this result is plotted. Herein, each of the values of L and C is adjusted such that the peak frequency fe is regularly set as 61.798 kHz to change fs/fu. A reason why the peak frequency fe is set to be constant is that the amplitude of Vo significantly changes in the vicinity of the unwanted vibration frequency fu of the piezoelectric element 101 by the value of fe.

In addition, the calculation is carried out by using the circuit of FIG. 4A as a related art configuration serving as a reference for comparison, and this result is plotted. The setting is made such that the self-inductance L of the inductor 102 in this case becomes 1.97 mH, and the peak frequency fe of the AC voltage Vo becomes 61.798 kHz.

It may be understood from FIG. 5A that the phase of Vo of the related art configuration is delayed by as close as 60° at maximum. In contrast to this, in a case where fs/fu=1 is established, the phase change of Vo hardly occurs. It should be noted that in the case of fs/fu=1, the self-inductance L of the inductor 102 is 4.17 mH, and the electrostatic capacitance C of the capacitor 103 is 3.12 nF. As a tendency, the change in the phase is increased towards the negative side as fs/fu<1 is established, and the change in the phase is increased towards the positive side as fs/fu>1 is established.

Figure 5B:
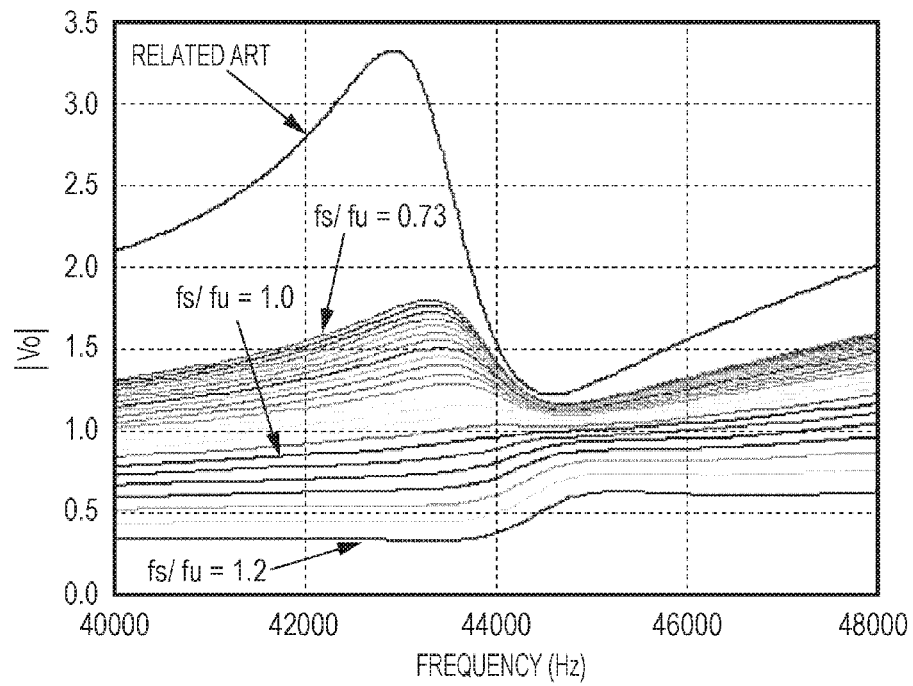

FIG. 5B illustrates a result as the calculation indicating the change in the AC voltage Vo in accordance with the frequency to investigate the relationship between the phase change of the AC voltage Vo and an amplitude variation of the AC voltage Vo which is illustrated in FIG. 5A. The calculation condition is similar to that of FIG. 5A. A resultant obtained by changing fs/fu in the range from 0.73 to 1.2 is compared with the related art configuration, and this result is plotted. It may be understood that the change amount of the phase illustrated in FIG. 5B corresponds to the tendency of the voltage variation amount illustrated in FIG. 5A. That is, as the change in the phase of Vo is larger, the amplitude variation of Vo is further increased.

Figure 6:
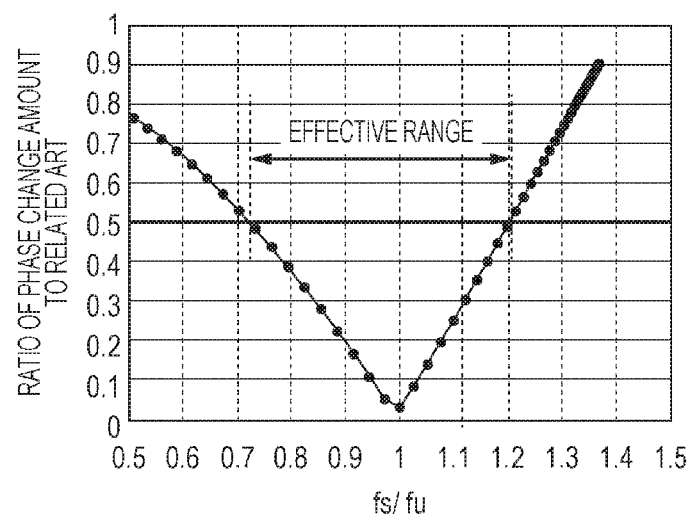
FIG. 6 illustrates a ratio of a phase change amount in accordance with a change of fs/fu.

FIG. 6 illustrates a calculation result indicating a ratio of the phase change amount of the embodiment to the phase change amount of the related art configuration in accordance with a change in fs/fu. The horizontal axis indicates fs/fu corresponding to a ratio of fs to the unwanted vibration frequency fu of the piezoelectric element 101. The vertical axis indicates a ratio of the phase change amount of the embodiment to the phase change amount of the related art configuration, and the ratio is calculated as follows.

First, an absolute value of the phase change amount of Vo in a case where the related art configuration is used is calculated in the range from 40 kHz to 48 kHz to detect a maximum value. This value is set as a "phase maximum change amount of the related art configuration". Subsequently, in the configuration of FIG. 1A, while fs/fu is set as a parameter, an absolute value of the phase change amount of Vo is calculated in the range from 40 kHz to 48 kHz to detect a maximum value. This value is set as a "phase maximum change amount in accordance with fs/fu". The ratio of the phase change amount to the related art configuration is obtained by calculating a ratio of both values using the following expression.

"Phase maximum change amount in accordance with fs/fu"/"Phase maximum change amount of the related art configuration"

The vertical axis indicates this ratio.

A condition under which the ratio of the phase change amount to the related art configuration is halved is set as a threshold as illustrated in FIG. 6, and a preferably adopted range to reduce the voltage peak of the AC voltage Vo in the vicinity of fu is obtained. As a result, a range where the effect of fs/fu is attained corresponds to the following relationship.

$$0.73 \cdot fu < fs < 1.2 \cdot fu$$

The above-described range is calculated while the peak frequency fe is set as 61.798 kHz and the electrostatic capacitance Cd (104) of the piezoelectric element 101 is set as 3.5 nF, but even when the values of the peak frequency fe and the intrinsic electrostatic capacitance Cd are changed, a substantially equal calculation result is obtained. It should be noted that the calculation is carried out while the equivalent coil Lu of the unwanted vibration of the piezoelectric element 101 is set as 0.1 H, the equivalent condenser Cu is set as 130 pF, and the equivalent resistance Ru is set as 1 kΩ.

Thus, while the change amount of the phase difference of the AC voltage Vo is suppressed to half or below in accordance with the above-described range, it is also possible to suppress the variation amount of Vo to approximately half or below as compared with the related art. That is, even when fs and fu are not completely matched with each other, while the above-described relationship between fs and fu is satisfied, it is possible to suppress the voltage peak of the AC voltage Vo in the vicinity of fu to half or below as compared with the case of the driving circuit in the related art.

Therefore, it is possible to provide the driving circuit in which the voltage variation is low with respect to the change in the impedance at the unwanted vibration frequency, and the unwanted vibration is suppressed.

Second Exemplary Embodiment

Next, a second exemplary embodiment will be described with reference to FIG. 7. The present exemplary embodiment is different from the first exemplary embodiment in that boosting is performed by using a transformer and a coil.

Figure 7:
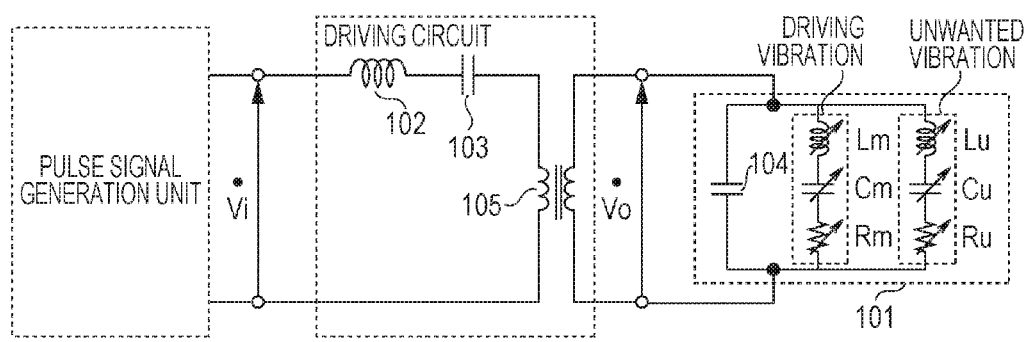
FIG. 7 illustrates a vibration device including a driving circuit for a vibration type actuator and the vibration type actuator according to a second exemplary embodiment.

FIG. 7 illustrates a vibration device including a driving circuit for a vibration type actuator and the above-described vibration type actuator according to the second exemplary embodiment. According to the configuration of the driving circuit, a first terminal of the piezoelectric element 101 and a first terminal on a secondary side coil of a transformer 105 are electrically connected to each other, and a second terminal of the piezoelectric element 101 and a second terminal of the secondary side coil are electrically connected to each other. That is, the AC voltage Vo applied between the two terminals of the piezoelectric element 101 is equal to a voltage Vo applied between the two terminals of the secondary side coil of the transformer 105. In addition, the inductor 102 and the capacitor 103 are connected in series to a transformer primary side coil. Herein, an electrostatic capacitance element such as a ceramic condenser or a film condenser can be used as the capacitor 103. It should be noted that the capacitor 103 is connected to an upper side of the transformer primary side coil but may be connected to a lower side instead.

Herein, the series resonance frequency based on the inductor 102 and the capacitor 103 is defined as fs, and the unwanted vibration frequency of the piezoelectric element 101 is defined as fu. When the inductor 102 is set as L, and the capacitor 103 is set as C, the following expressions are established.

$$fs = 1/(2\pi\sqrt{LC}) \quad (2\text{-}1)$$

$$fu = 1/(2\pi\sqrt{LuCu}) \quad (2\text{-}2)$$

As described above, Lu and Cu denote constants of the equivalent circuit of the unwanted vibration of the piezoelectric element 101, in which Lu represents the equivalent coil, and Cu represents the equivalent condenser.

Similarly as in the first exemplary embodiment, as the series resonance frequency fs is set to be closer to the unwanted vibration frequency fu of the piezoelectric element 101, it is possible to attain the effect of the reduction in the voltage variation because of the suppression of the change in the impedance described above. While the driving circuit is constituted such that fu and fs satisfy the following expression, the voltage peak of the AC voltage Vo in the vicinity of fu can be reduced to half or below as compared with the case of the driving circuit in the related art including the transformer and the condenser without the capacitor as occupied in FIG. 9.

$$0.73 \cdot fu < fs < 1.2 \cdot fu$$

Modified Example of the Second Exemplary Embodiment

Figure 8A:
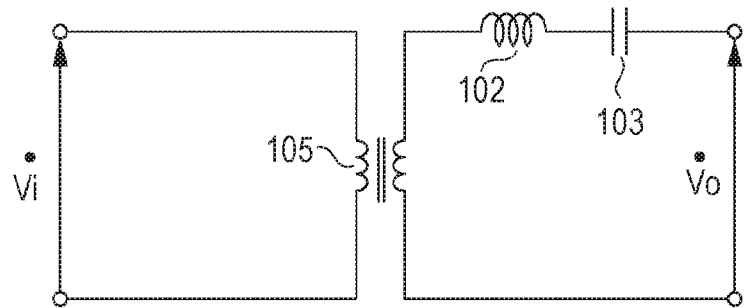
FIGS. 8A to 8D illustrate a modified example of the driving circuit for the vibration type actuator according to the second exemplary embodiment.
Figure 8B:
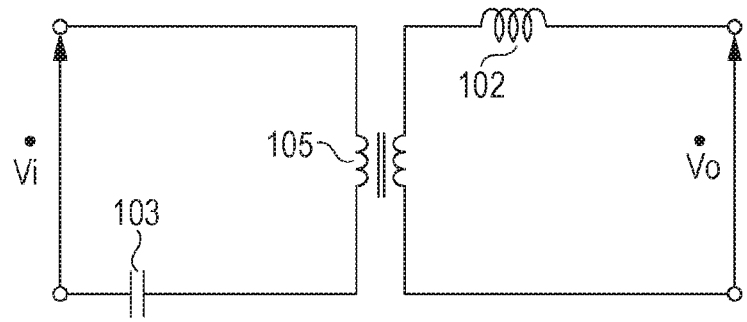
Figure 8C:
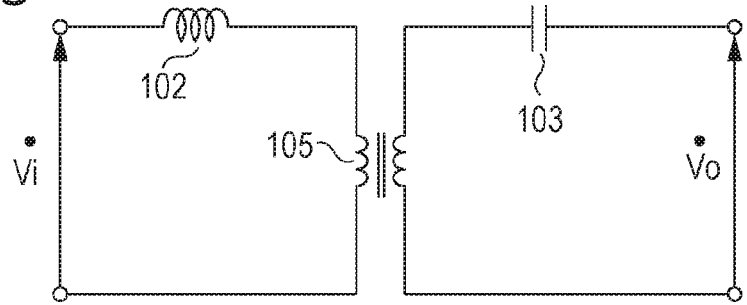
Figure 8D:
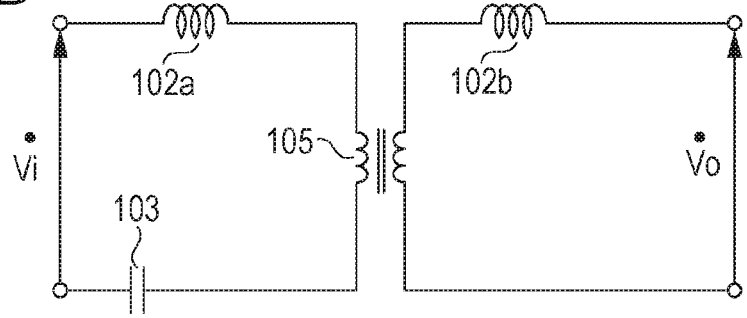

FIGS. 8A to 8D illustrate the driving circuit for the vibration type actuator according to a modified example of the second exemplary embodiment. FIGS. 8A to 8C correspond to a configuration in which the arrangement of the inductor 102 and the capacitor 103 is changed in the primary side and the secondary side of the transformer 105. It should be noted that each of the inductor 102 and the capacitor 103 may be arranged on the upper side or the lower side. FIG. 8D corresponds to a configuration using a leakage inductance 102a of the transformer primary side coil and a leakage inductance 102b of a transformer secondary side coil.

In the driving circuit of FIG. 8A, when the inductor 102 is set as L and the capacitor 103 is set as C, the series resonance frequency fs is similar to Expression (2-1).

In the driving circuit of FIG. 8B, when a winding ratio of the transformer is set as N, the following expression is established.

$$fs = 1/(2\pi\sqrt{LC/N^2}) \quad (2\text{-}3)$$

In the driving circuit of FIG. 8C, the following expression is established.

$$fs = 1/(2\pi\sqrt{LC \cdot N^2}) \quad (2\text{-}4)$$

In the driving circuit of FIG. 8D, when the leakage inductance 102a of the transformer primary side coil is set as $L_1$, the leakage inductance 102b of the transformer secondary side coil is set as $L_2$, a winding ratio of the secondary side coil to the primary side coil is set as N, and the capacitor 103 is set as C, the following expression is established.

$$fs=1/(2\pi\sqrt{\{L_1+(L_2/N^2)\}C}) \qquad (2\text{-}5)$$

While the driving circuit is constituted such that the thus obtained series resonance frequency fs and the unwanted vibration frequency fu of the piezoelectric element 101 satisfy the following expression, it is possible to attain the effect of the reduction in the voltage variation because of the suppression of the change in the impedance described above.

$$0.73 \cdot fu < fs < 1.2 \cdot fu$$

Advantage of One Aspect of the Embodiments

Next, a measurement result by driving the driving circuit obtained by experimentally producing the vibration type actuator will be described.

Figure 9:
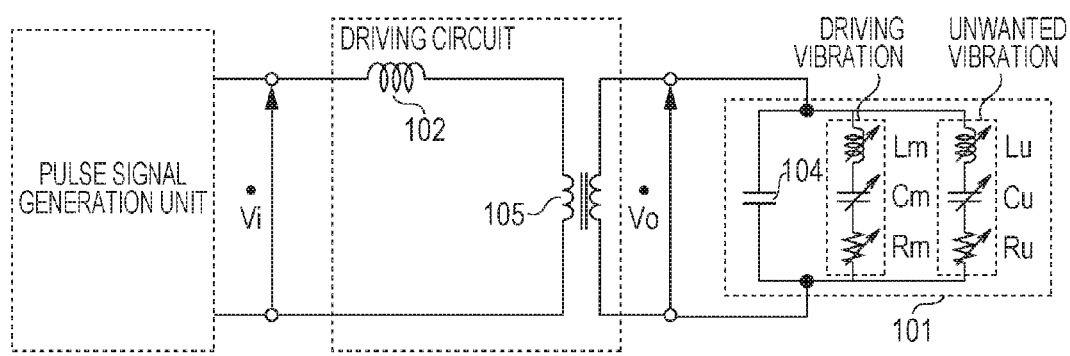
FIG. 9 illustrates a vibration device including a driving circuit in a related art.

FIG. 9 illustrates a vibration device including the driving circuit in the related art and the vibration type actuator, in which only the inductor 102 is connected to the primary side of the transformer, and the capacitor is not connected to the primary side of the transformer. While the self-inductance L of the inductor 102 is set as 15 μH, the inductance of the primary side coil of the transformer is set as 19 μH, the inductance of the secondary side coil is set as 1.69 mH, and the winding ratio is set as 9.5 folds, the AC voltage is applied to the piezoelectric element 101. The electrostatic capacitance Cd (104) of the piezoelectric element 101 is 1.5 nF, the driving vibration frequency fm is 88 kHz, and the unwanted vibration frequency fu is 106 kHz.

Figure 10A:
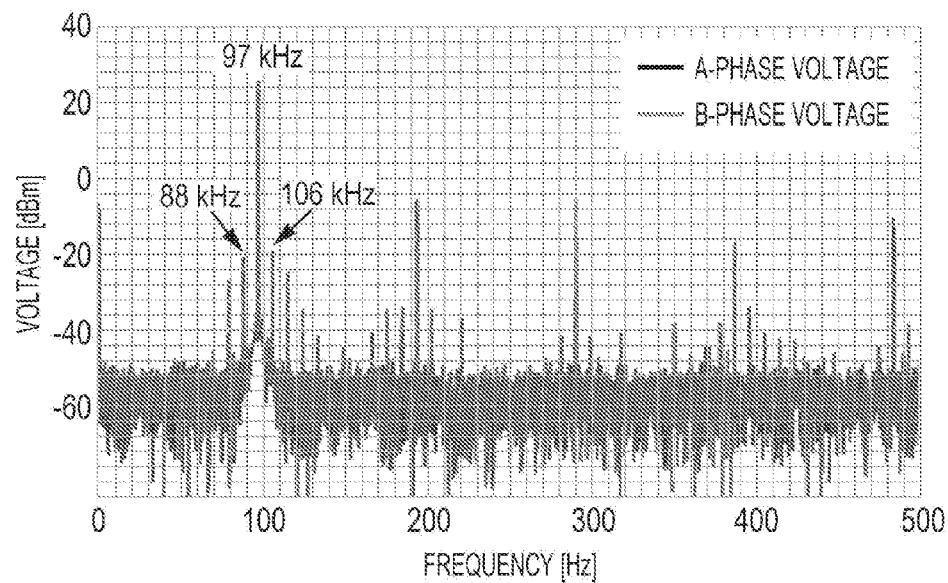
FIGS. 10A and 10B illustrate a frequency analysis result of an AC voltage and a driving current in a case where the driving circuit in the related art is used.
Figure 10B:
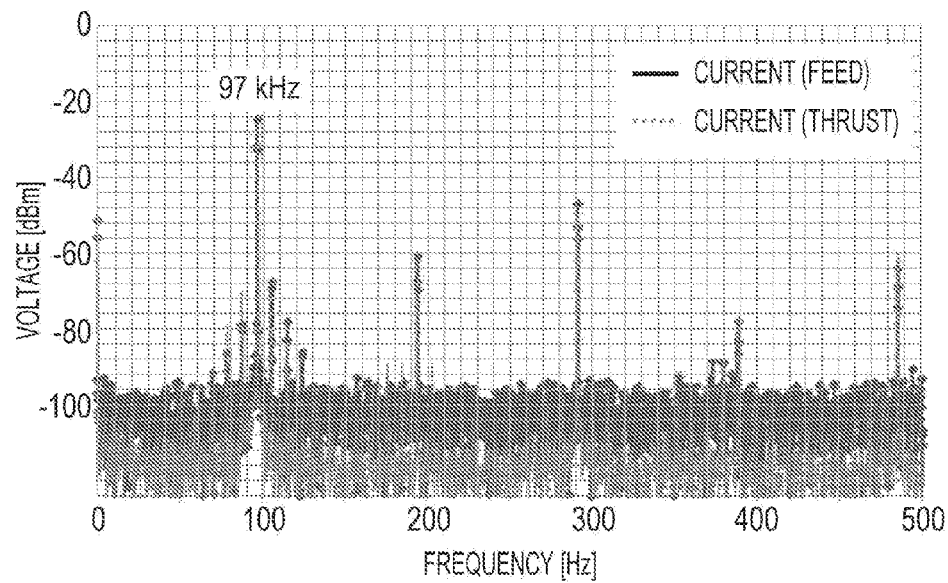

FIGS. 10A and 10B illustrate a frequency analysis result of the AC voltage Vo and a driving current in a case where a driving circuit in a related art is used. In FIG. 10A, the horizontal axis indicates a frequency, and the vertical axis indicates a voltage amplitude of Vo. A frequency of 97 kHz at which the peak value is the highest is a frequency of an input Vi of the driving circuit and is a frequency for controlling the driving speed of the vibration type actuator. Peaks at 88 kHz and 106 kHz are generated in a side band at 97 kHz, and it is conceivable that the voltage peak is generated under the influence of the impedance variation of the unwanted vibration.

In FIG. 10B, the horizontal axis indicates a frequency, and the vertical axis indicates a current amplitude flowing through the piezoelectric element. Similarly as in the result of the voltage amplitude, it may be understood that a situation is established where a peak accompanied by the unwanted vibration is also generated in the current amplitude. That is, it is conceivable that the current accompanied by the unwanted vibration flows through the piezoelectric element to cause the impedance variation, and the driving voltage Vo has the voltage peak at the unwanted vibration frequency to further amplify the unwanted vibration of the piezoelectric element. In the case of the driving in the driving circuit in the related art, the abnormal noise is generated in the vibration type actuator.

In contrast to this, descriptions will be given of a case where the driving circuit illustrated in FIG. 8C corresponding to the driving circuit according to the exemplary embodiment is used. The self-inductance L of the inductor 102 is set as 15 μH, and the electrostatic capacitance C of the capacitor 103 is set as 1.5 nF. While the inductance of the primary side coil of the transformer is set as 19 μH, the inductance of the secondary side coil is set as 1.69 mH, and the winding ratio is set as 9.5 folds, the AC voltage is applied to the piezoelectric element 101. The series resonance frequency fs is 112 kHz.

Figure 11A:
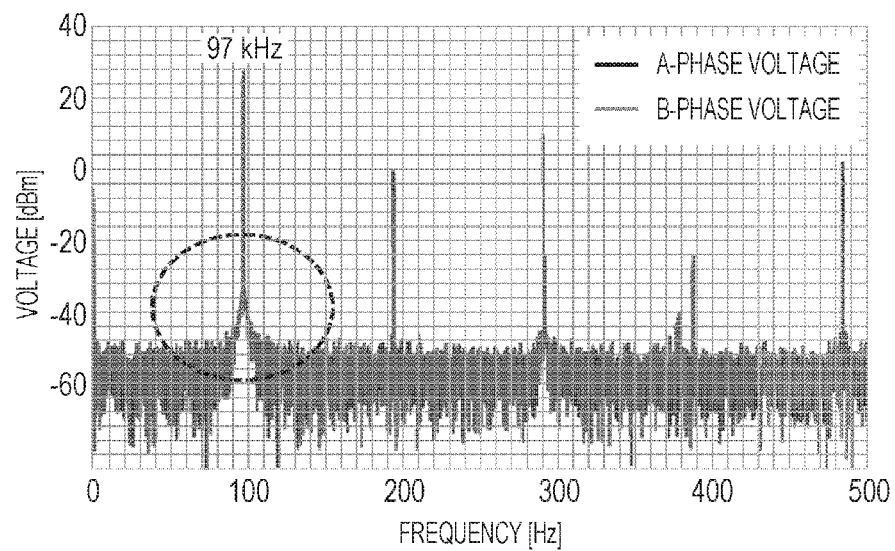
FIGS. 11A and 11B illustrate a frequency analysis result of the AC voltage and the driving current in a case where the driving circuit according to the exemplary embodiment is used.
Figure 11B:
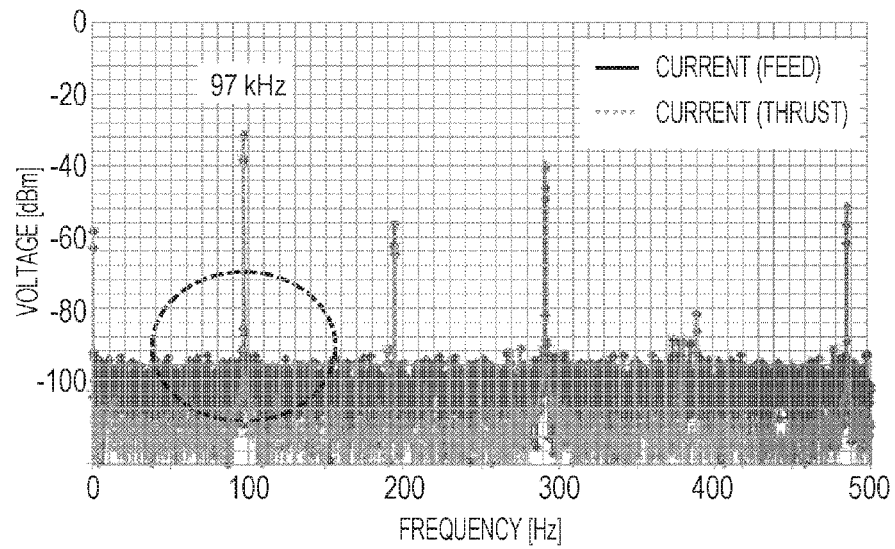

FIGS. 11A and 11B illustrate a frequency analysis result of the AC voltage Vo and the driving current in a case where the exemplary embodiment is used. In FIG. 11A, the horizontal axis indicates a frequency, and the vertical axis indicates the voltage amplitude of Vo. It may be understood that the peak of the unwanted vibration is not generated in the side band at 97 kHz corresponding to an input frequency of the driving circuit. The same also applies to the current amplitude of FIG. 11B. As a result, the unwanted vibration is not amplified by the driving circuit, and it is possible to suppress the generation of the abnormal noise.

Figure 12:
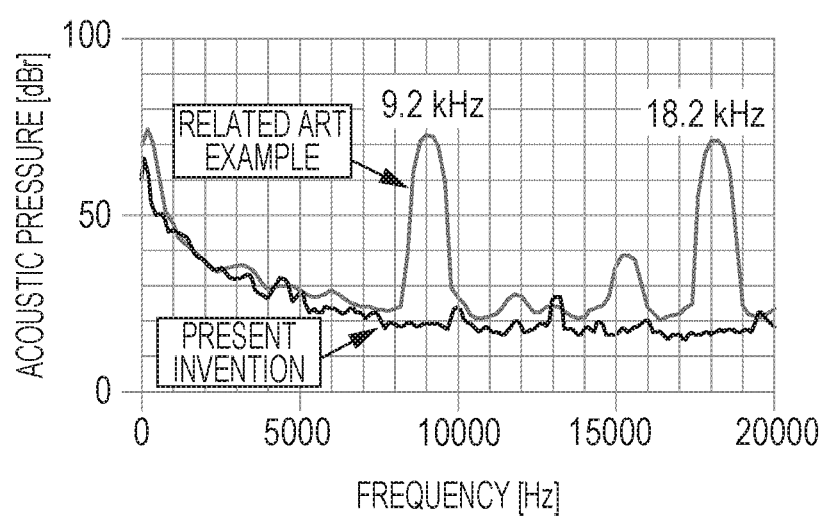
FIG. 12 illustrates a frequency characteristic obtained by measuring driving sound by a microphone at the time of the driving of the vibration type actuator.

FIG. 12 illustrates a frequency characteristic obtained by measuring driving sound by a microphone at the time of the driving of the vibration type actuator. In the driving circuit in the related art, a peak is generated at 9.2 kHz in an audible spectrum to generate the abnormal noise. The peak at 9.2 kHz is generated on the basis of a difference between the input frequency of the driving circuit of 97 kHz and the unwanted vibration frequency of 106 kHz. In contrast to this, in a case where the driving circuit according to the exemplary embodiment is applied to the configuration, since the peak of the unwanted vibration disappears, the peak at 9.2 kHz corresponding to the difference also disappears, and it is conceivable that the generation of the abnormal noise can be avoided.

Third Exemplary Embodiment

Circuit with a Resistance Arranged in Parallel

Figure 13A:
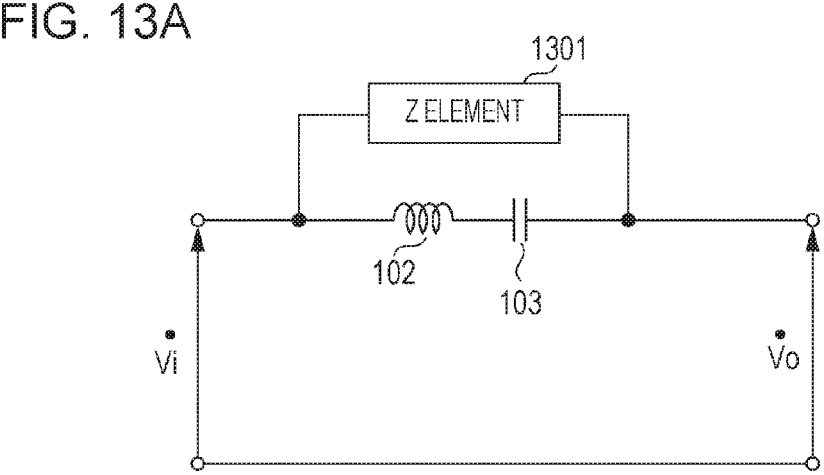
FIGS. 13A to 13C illustrate a driving circuit for a vibration type actuator according to a third exemplary embodiment.
Figure 13B:
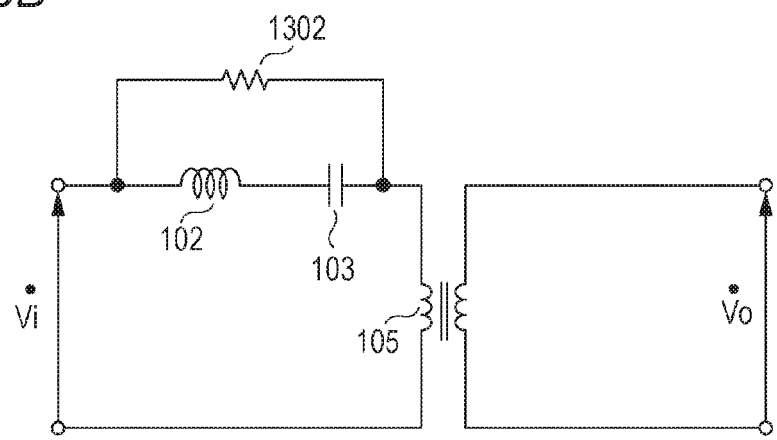
Figure 13C:
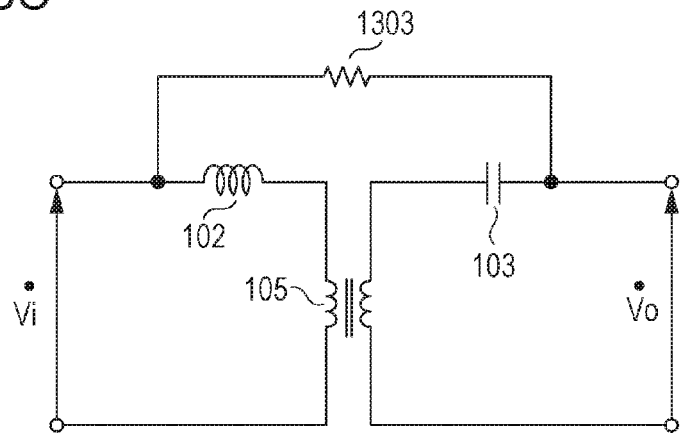

Next, a third exemplary embodiment will be described. FIGS. 13A to 13C illustrate a vibration device including a driving circuit for the vibration type actuator and the vibration type actuator according to the third exemplary embodiment. According to the present exemplary embodiment, attenuation of the current flowing through the piezoelectric element at the unwanted vibration frequency fu can be realized, and the effect of further suppressing the unwanted vibration can be attained.

FIG. 13A illustrates a configuration in which an impedance (Z) element 1301 is connected in parallel to a set of the inductor 102 and the capacitor 103. As the impedance element, an element having a resistance component to an AC signal such as a resistance, a condenser, or a coil is used. FIG. 13B illustrates a configuration in which a resistance 1302 is connected in parallel to a set of the inductor 102 and the capacitor 103. For example, fs and fu can be matched with each other when a resistance of 50Ω is connected, and it is possible to realize the attenuation of the unwanted vibration current.

In addition to the above, in a case where the inductor 102 and the capacitor 103 are respectively provided in the primary side and the secondary side of the transformer as illustrated in FIG. 13C, a resistance 1303 may be connected in parallel as illustrated in the drawing. For example, fs and fu can be matched with each other when a resistance of 300Ω is connected, and it is possible to realize the attenuation of the unwanted vibration current.

In this manner, even when the impedance element is further provided, while the driving circuit is constituted such that the series resonance frequency fs based on the inductor 102 and the capacitor 103 and the unwanted vibration frequency fu of the piezoelectric element 101 satisfy the following expression, the above-described effect can be attained. That is, the effect of the reduction in the voltage variation because of the suppression of the change in the impedance can be attained.

$$0.73 \cdot fu < fs < 1.2 \cdot fu$$

Fourth Exemplary Embodiment

Application Example to a Camera or a Stage

An example in which a driving circuit for a vibration type actuator according to the exemplary embodiment is applied to an image pickup apparatus (optical device) such as a camera will be described. Herein, an example in which a vibration type actuator configured to drive a lens is built in a lens barrel of the image pickup apparatus will be described with reference to FIG. 14.

FIG. 14 is a cross sectional view of the camera functioning as the image pickup apparatus configured to correct image blur by a correction lens. The camera of FIG. 14 has a shooting function of video and still images. FIG. 14 illustrates a lens barrel 61 and a camera body 62. A correction optical apparatus 68 is built in the lens barrel 61. The correction optical apparatus 68 according to the present exemplary embodiment is provided with a correction lens 31 and a moving board (driven member) 32 that holds the correction lens 31, and the moving board 32 performs translational movement in a plane perpendicular to an optical axis 40 of the correction optical apparatus 68 by a vibration type actuator 42 included in each of a rotating ring 65 and a sliding board 41. An image pickup element 67 is provided on an optical axis of the correction lens 31.

Although not illustrated in FIG. 14, the lens barrel 61 is provided with an optical system other than the correction lens 31, an acceleration sensor configured to detect a deviation of the lens barrel 61, and an encoder configured to detect a two-dimensional movement of the moving board 32. Furthermore, the lens barrel 61 is provided with a power supply that supplies electric energy to the driving device and a control unit configured to process a signal of the acceleration sensor and a signal of the encoder to operate the power supply.

The image pickup element 67 is included in the camera body 62. Light from an object transmits through an optical system including the correction lens 31 in the lens barrel 61 to be incident on the image pickup element 67 in the camera body 62. The configuration is adopted in which, while the correction lens 31 is moved by the correction optical apparatus 68 on the basis of the signal of the acceleration sensor, image blur can be corrected.

According to the present exemplary embodiment, the example of the image pickup apparatus including the correction optical apparatus configured to correct the image blur by moving the lens by the vibration type actuator has been described, but the application example of the disclosure is not limited to this. For example, the configuration can also be applied to the image pickup apparatus including the correction optical apparatus configured to correct the image blur by moving the image pickup element by the vibration type actuator or the like.

In addition, FIG. 14 illustrates the example in which the driving circuit for the vibration type actuator according to the exemplary embodiment and the vibration type actuator are used in the image pickup apparatus, but the applied example is not limited to this, and the configuration can be also used for the driving of various stages of a microscope or the like. For example, an example in which the configuration is used for the driving of the stage of the microscope will be described with reference to FIG. 15.

Figure 15:
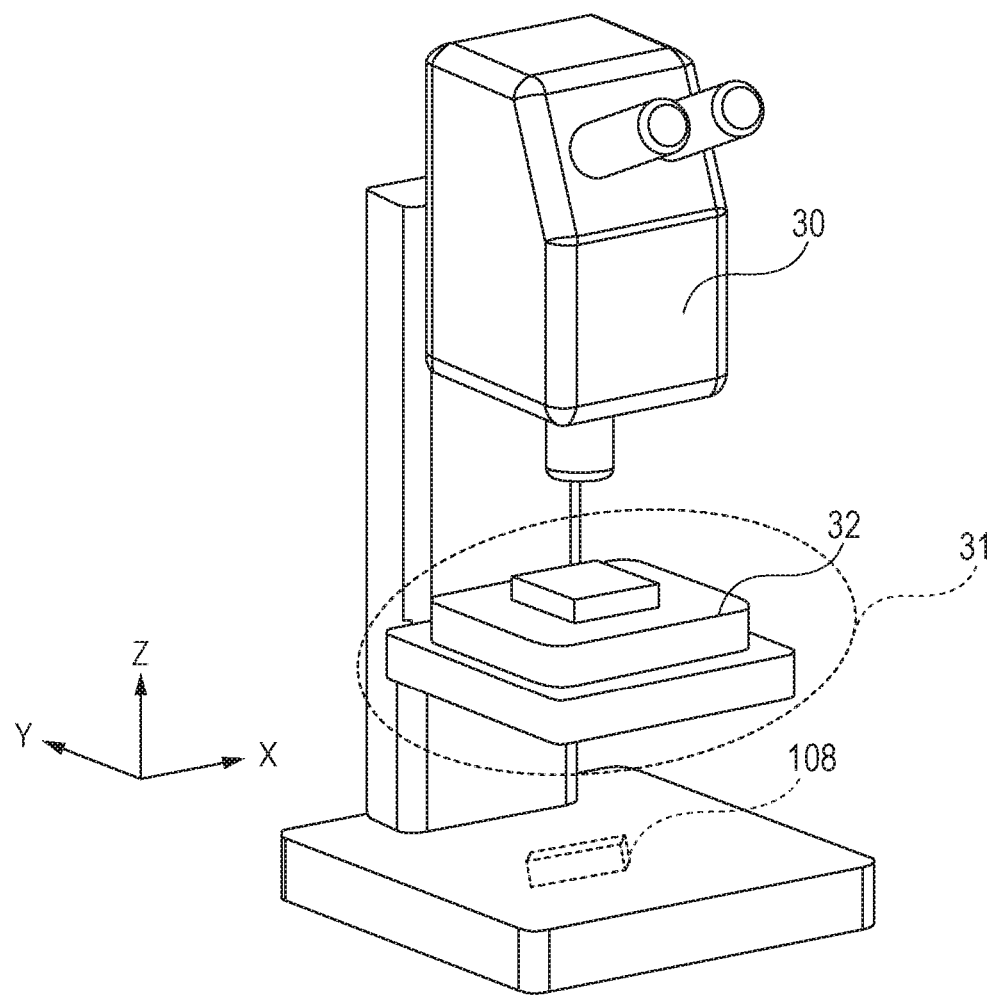
FIG. 15 is a perspective view of a microscope to which the driving circuit for the vibration type actuator according to the exemplary embodiment is applied.

FIG. 15 is a perspective view of a microscope to which the driving circuit for the vibration type actuator according to the exemplary embodiment is applied. The microscope of FIG. 15 includes an image pickup unit 30 in which an image pickup element and an optical system are built in and an automatic stage 31 including a stage 32 provided on a base and moved by a vibration type driving device. An object to be observed is placed on the stage 32, and an enlarged image is shot by the image pickup unit 30. In a case where an observation range exists in a wide range, while the stage 32 is moved by the vibration type driving device to move the object to be observed in an X-direction or a Y-direction and obtain a large number of shot images. The shot images are combined with one another by a computer that is not illustrated in the drawing, and it is possible to obtain one image having a wide observation range and also a high resolution.

The abnormal noise generated by the unwanted vibration of the vibrator can be suppressed by the driving circuit.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2015-161357, filed Aug. 18, 2015, which is hereby incorporated by reference herein in its entirety.

What is claimed is:

1. A driving circuit for a vibration type actuator, the driving circuit comprising an inductor and a capacitor which are connected in series with the inductor,
    wherein the inductor and the capacitor are configured to be connected in series to an electric-mechanical energy conversion element of a vibrator, and
    wherein, in a case where a series resonance frequency based on the inductor and the capacitor is set as fs, and a resonance frequency in a vibration mode other than vibration used for driving of the vibrator is set as fu, $0.73 \cdot fu < fs < 1.2 \cdot fu$ is satisfied.

2. The driving circuit for the vibration type actuator according to claim 1, wherein an admittance of the vibration mode in which the resonance frequency is set as fu is higher than an admittance of any one of vibrations used for driving.

3. The driving circuit for the vibration type actuator according to claim 1, wherein an impedance element is connected in parallel to a set of the inductor and the capacitor.

4. A vibration device comprising:
    the driving circuit according to claim 1; and
    the vibration type actuator that includes the electric-mechanical energy conversion element and is driven by the driving circuit.

5. The vibration device according to claim 4, wherein the vibration type actuator is configured such that, while an alternating-current voltage is applied to the electric-mechanical energy conversion element, a vibration wave is excited in the vibrator including the electric-mechanical energy conversion element, and the relative position of the vibrator and part of the driven member in contact with the vibrator changes by the vibration wave.

6. An image blur correction apparatus comprising:
    the vibration device according to claim 4; and
    a lens moved by the vibration device.

7. A replacement lens comprising:
the vibration device according to claim 4; and
a lens moved by the vibration device.

8. An image pickup apparatus comprising:
the vibration device according to claim 4;
a lens moved by the vibration device; and
an image pickup element provided on an optical axis of the lens.

9. An image pickup apparatus comprising:
the vibration device according to claim 4;
an image pickup element moved by the vibration device; and
a lens in which the image pickup element is provided on an optical axis.

10. An automatic stage comprising:
the vibration device according to claim 4; and
a stage moved by the vibration device.

11. A vibration device comprising:
the driving circuit according to claim 1;
the vibration type actuator that includes the vibrator including the electric-mechanical energy conversion element and a driven member in contact with the vibrator and that is driven by the driving circuit; and
a position sensor configured to detect a relative position of a portion in contact with the electric-mechanical energy conversion element in the driven member and the electric-mechanical energy conversion element.

12. A driving circuit for a vibration type actuator, the driving circuit comprising:
a transformer that includes a primary side coil and a secondary side coil and is configured such that an alternating-current voltage is applied to the primary side coil, a first terminal of the secondary side coil is connected to a first terminal of an electric-mechanical energy conversion element of a vibrator, and a second terminal of the secondary side coil is connected to a second terminal of the electric-mechanical energy conversion element; and
an inductor and a capacitor connected in series to at least one of the primary side coil and the secondary side coil of the transformer,
wherein, in a case where a series resonance frequency based on the inductor and the capacitor is set as fs, and a resonance frequency in a vibration mode other than a vibration used for driving of the vibrator is set as fu, $0.73 \cdot fu < fs < 1.2 \cdot fu$ is satisfied.

13. The driving circuit for the vibration type actuator according to claim 12, wherein an admittance of the vibration mode in which the resonance frequency is set as fu is higher than an admittance of any one of vibrations used for driving.

14. The driving circuit for the vibration type actuator according to claim 12, wherein an impedance element is connected in parallel to a set of the inductor and the capacitor.

15. A vibration device comprising:
the driving circuit according to claim 12; and
the vibration type actuator that includes the electric-mechanical energy conversion element and is driven by the driving circuit.

16. The vibration device according to claim 15, wherein the vibration type actuator is configured such that, while an alternating-current voltage is applied to the electric-mechanical energy conversion element, a vibration wave is excited in the vibrator including the electric-mechanical energy conversion element, and the relative position of the vibrator and part of the driven member in contact with the vibrator changes by the vibration wave.

17. An image blur correction apparatus comprising:
the vibration device according to claim 15; and
a lens moved by the vibration device.

18. A replacement lens comprising:
the vibration device according to claim 15; and
a lens moved by the vibration device.

19. An image pickup apparatus comprising:
the vibration device according to claim 15;
a lens moved by the vibration device; and
an image pickup element provided on an optical axis of the lens.

20. An image pickup apparatus comprising:
the vibration device according to claim 15;
an image pickup element moved by the vibration device; and
a lens in which the image pickup element is provided on an optical axis.

21. An automatic stage comprising:
the vibration device according to claim 15; and
a stage moved by the vibration device.

22. A vibration device comprising:
the driving circuit according to claim 12;
the vibration type actuator that includes the vibrator including the electric-mechanical energy conversion element and a driven member in contact with the vibrator and that is driven by the driving circuit; and
a position sensor configured to detect a relative position of a portion in contact with the electric-mechanical energy conversion element in the driven member and the electric-mechanical energy conversion element.

* * * * *